Nov. 10, 1953  L. A. SIMMONS  2,658,363
COOKING SPOON HOLDER FOR ATTACHMENT TO COOKING VESSELS
Filed March 20, 1951
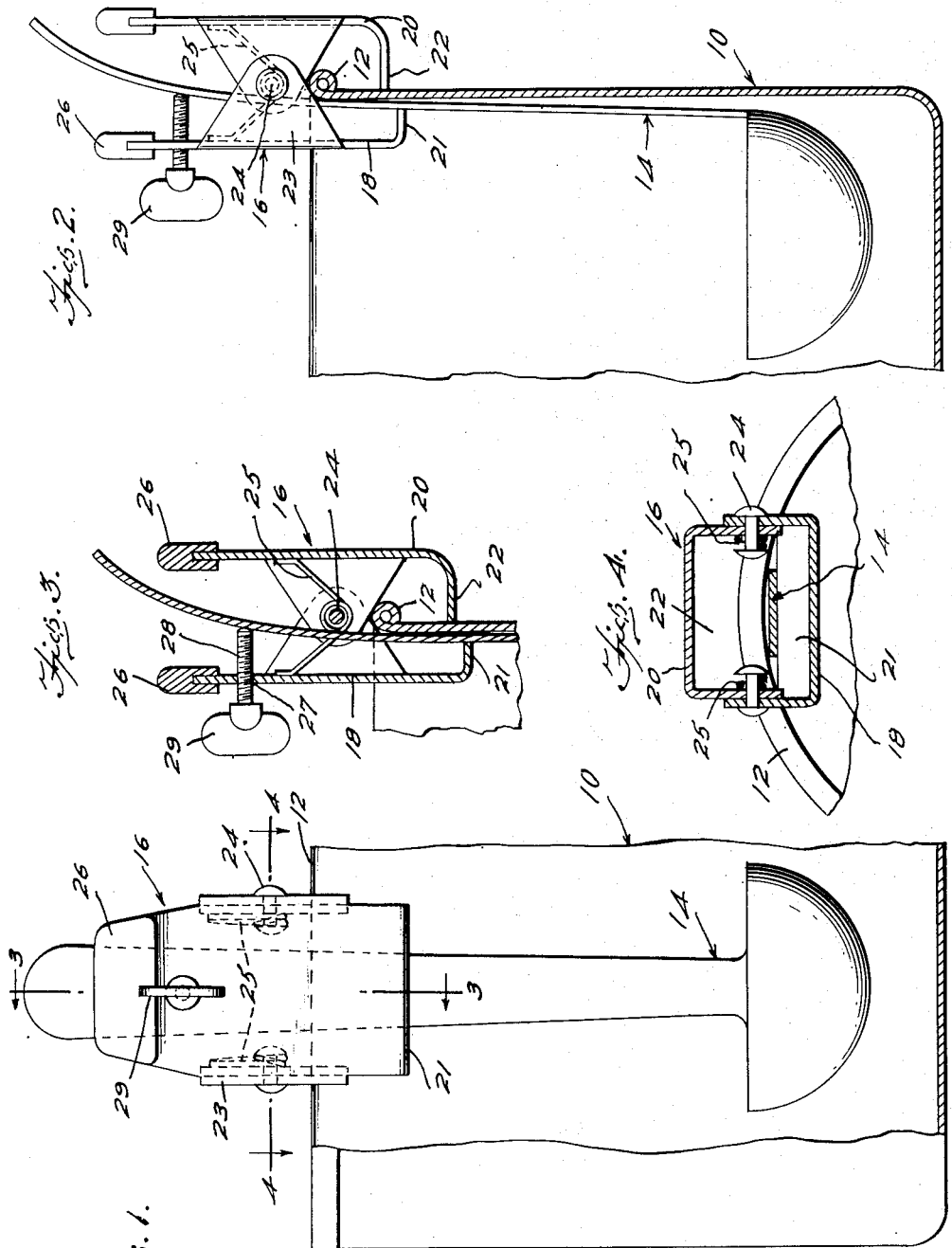
INVENTOR.
Luella A. Simmons
BY
Wilfred E. Lawson
ATTORNEY Patented Nov. 10, 1953

2,658,363

UNITED STATES PATENT OFFICE 2,658,363

COOKING SPOON HOLDER FOR ATTACHMENT TO COOKING VESSELS

Luella A. Simmons, Los Angeles, Calif.

Application March 20, 1951, Serial No. 216,549

1 Claim. (Cl. 65—65)

This invention relates to improvements in devices for expediting work in connection with cooking operations and is directed particularly to improvements in cooking spoon holding devices.

Various devices have heretofore been provided for holding cooking spoons in position on the side of a cooking vessel while not in use, so that drippings will fall back into the vessel and so that the spoon can be readily picked up when needed for use, but such devices are either too complicated for the simple function which they are intended to perform, or the use of both hands is required to remove the spoon from its holder or return it thereto, or some other undesirable feature is involved.

It is therefore an object of the present invention to provide a simply constructed but efficient device whereby a cooking spoon, ladle or the like, may be attached to and supported from the edge of a cooking utensil in such a manner that it can be easily and quickly removed or replaced by the use of one hand.

Another object of the invention is to provide a device of the character stated which remains attached to the handle of the spoon, ladle or the like, while the latter is in use, but which can be easily and quickly removed, or applied.

Other objects of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in elevation of a device constructed in accordance with the present invention, looking at the inner side thereof and showing the support thereby of a spoon.

Figure 2 is a view of the same, with spoon attached, in side elevation, a portion of the supporting receptacle being in section.

Figure 3 is a sectional view taken substantially on the line 3—3 of Figure 1.

Figure 4 is a horizontal section taken substantially on the line 4—4 of Figure 1.

Referring more particularly to the drawing, the numeral 10 generally designates a portion of a vessel from the edge 12 of which the spoon, ladle or the like 14, is to be suspended by the holding device which is generally designated 16.

As shown, the device 16 comprises an inner jaw plate 18 and an outer jaw plate 20. These jaw plates, or jaws, have the bottom edges, turned to form lips 21 and 22 respectively, which, while not opposed to one another in line, are opposed in action.

The inner jaw plate has midway of each longitudinal edge, a right angularly turned hinge ear 23, and the outer jaw has a corresponding hinge ear, on each longitudinal edge. Each of these latter ears is in overlapping relation with an ear 23 and each two adjacent ears are pivotally coupled by a rivet 24.

Each rivet also carries a coil spring 25, the free ends of which are pressed against the inner faces of the jaw plates, as shown in Figure 3, above the axis of the pivot rivets, to urge the jaw lips together.

The top ends of the jaw plates are preferably reduced slightly in width and each such end carries a head 26 of a heat insulation material.

The inner jaw plate, above the horizontal plane of the pivot rivets, or hinge, has a threaded opening 27 therethrough, in the longitudinal center of the plate, through which is threaded a binding screw 28, having a broad head 29 on its outer end.

In use the handle of the spoon 14 is extended between the jaw plates where it will be gripped between the lips 21 and 22 when the device is not applied to the rim 12 of the vessel 10. The screw 28 is then run in until it engages the spoon handle. Thus the device is attached to the spoon and after the spoon is used the holding device is mounted on the rim by pressing together the heads 26 to separate the jaw lip 22 from the back of the spoon handle sufficiently to permit insertion of the rim therebetween and on release the jaws will be forced together to press the spoon handle against the wall of the vessel, as shown.

I claim:

A device for securing a cooking spoon to the rim of a vessel, said device comprising two elongate spaced juxtaposed jaw members, hinge ears carried by and extending at right angles to each of said members at opposite longitudinal edges and substantially midway between the ends thereof, the ears of one member being in coacting overlapping relation with corresponding adjacent ears of the other member, a pivot rivet passing through and coupling each two overlapping ears, said rivets being spaced apart at their inner ends to permit the handle of a spoon to be passed therebetween, each of said members having a portion of one end directed at substantially right angles toward the other member forming a jaw, the jaw carrying end of one member extending beyond the corresponding end of the adjacent member, a coil spring encircling each rivet on the inner side of the adjacent ears, said springs engaging said members and constantly urging the jaws together, finger engaging heads upon the other ends of the jaw members, and a spoon handle engaging set screw threaded transversely through one jaw member toward the other member on the side of the pivot rivets remote from the jaws for holding engagement with a spoon handle extending longitudinally between the members.

LUELLA A. SIMMONS.

References Cited in the file of this patent

UNITED STATES PATENTS

| Number | Name | Date |
|---|---|---|
| 260,160 | Burns | June 27, 1882 |
| 414,871 | Schlueter et al. | Nov. 12, 1889 |
| 592,181 | Tysen | Oct. 19, 1897 |
| 597,805 | Lownes | Jan. 25, 1898 |
| 668,088 | Bruce | Feb. 12, 1901 |
| 1,178,965 | Stroecker | Apr. 11, 1916 |
| 2,144,140 | Batcheller | Jan. 17, 1939 |
| 2,397,438 | Schmid | Mar. 26, 1946 |